United States Patent [19]

Kimura et al.

[11] Patent Number: 4,737,868

[45] Date of Patent: Apr. 12, 1988

[54] REPOSITIONER FOR STREAMING MAGNETIC TAPE DRIVE APPARATUS

[75] Inventors: Kiyosi Kimura, Hadano; Norio Nakayama, Atsugi; Yoshikazu Komatsu, Ebina, all of Japan

[73] Assignee: Anritsu Corporation, Tokyo, Japan

[21] Appl. No.: 915,229

[22] Filed: Oct. 3, 1986

[30] Foreign Application Priority Data

Oct. 8, 1985 [JP] Japan ................................. 60-224604

[51] Int. Cl.$^4$ ........................ G11B 15/44; G11B 27/22
[52] U.S. Cl. ................................... 360/74.4; 360/72.1
[58] Field of Search ............................. 360/72.1–72.3, 360/74.1, 74.4, 74.2, 74.3

[56] References Cited

U.S. PATENT DOCUMENTS

| | | | |
|---|---|---|---|
| 3,918,090 | 11/1975 | Ludwig et al. | 360/72.1 |
| 4,396,956 | 8/1983 | Hedlund | 360/74.3 |
| 4,418,367 | 11/1983 | Nagai et al. | 360/74.4 |
| 4,551,774 | 11/1985 | Sakaguchi et al. | 360/72.1 |
| 4,607,300 | 8/1986 | Aoyagi et al. | 360/74.2 |
| 4,628,377 | 12/1986 | Harigaya | 360/74.2 |

OTHER PUBLICATIONS

Valient, William A., *IEEE Transactions on Magnetics*, vol. Mag-17, No. 4, Jul., 1981, pp. 1438–1441.

*Primary Examiner*—Raymond F. Cardillo
*Assistant Examiner*—David L. Robertson
*Attorney, Agent, or Firm*—Frishauf, Holtz, Goodman & Woodward

[57] ABSTRACT

A repositioner for a streaming magnetic tape drive apparatus includes control circuitry which, when a repositioning instruction is received from an external device, supplies a drive stop instruction to a tape reel motor and a measurement start instruction to a tape travel distance measuring device when a first data block edge detection signal is reproduced from the tape within a certain time period. A tape stop detection signal is produced when forward movement of the tape ceases, and the control circuitry outputs a reverse drive instruction to the reel motor while supplying a reverse tape travel distance measurement start instruction to the distance measuring device. When the forward and reverse tape travel distances become equal and a data block edge detection signal is reproduced from the tape within a certain time period, a normal operation signal is provided to the external device to signal that a repositioning operation is normally performed. Accordingly, adjacent data blocks on the tape will not be erased, and data read access will not be started midway along an adjacent data block on the tape.

30 Claims, 5 Drawing Sheets

REPOSITIONER FOR STREAMING MAGNETIC TAPE DRIVE APPARATUS

BACKGROUND OF THE INVENTION

The present invention relates to a streaming magnetic tape drive apparatus which writes or reads data while winding a magnetic tape at a constant speed and, more particularly, to an improvement of a repositioner, used in the streaming magnetic tape drive apparatus, for repositioning a magnetic tape.

A conventional magnetic tape drive apparatus used as an external storage apparatus for a computer adopts a start/stop method in which a magnetic tape is temporarily stopped at an inter block gap (to be referred to as an IBG hereinafter) between adjacent data blocks for each data block during tape travel. This method is achieved by controlling tape travel by a capstan motor arranged in addition to a reel motor.

However, in recent years, another method (i.e., a streaming method) has become popular, in which the capstan motor is omitted, in view of high-speed tape travel or reduced cost, and a magnetic tape is continuously wound without being stopped at each IBG under the direct control of the reel motor. However, in a streaming magnetic tape drive apparatus in which a magnetic tape is controlled directly by the reel motor instead of a capstan motor, if the magnetic tape is required to stop at a certain IBG (because, for instance, a command from a host computer is delayed, which prevents the magnetic tape from maintaining its streaming travel, or written data including an error) and is made to stop there, the magnetic tape cannot stop at the IBG but will stop in the next data block. This is due to the inertia of its reels and the small length of the IBG (normally 0.6 inch). Therefore, in order to reposition the tape, an operation for rewinding the tape from the stopped point to an intermediate point of a designated IBG is required.

The repositioning operation of a repositioner used in the conventional streaming magnetic tape drive apparatus is performed based on tape position data from a tachometer and the like provided to a tape travel system. More specifically, assume that a stop signal is supplied to a reel motor when the tape has just reached the intermediate point of an Nth IBG passing an Nth data block while the tape-streaming travels at constant speed in the forward direction. In this case, the tape cannot be immediately stopped due to the inertia of its reels, and the tape speed is gradually reduced and the tape is stopped at a point past the Nth IBG. A tape travel distance from the point at which a tape travel stop instruction has been generated to the point at which the tape is actually stopped is measured by, e.g., a tachometer. The tachometer comprises, e.g., a light-emitting element, a light-receiving element, and a rotating member, which is arranged between these elements, has a slit, and is in frictional contact with the tape. The tachometer generates a pulse each time light from the light-emitting element is received by the light-receiving element upon rotation of the rotating member. The output pulses are supplied to, e.g., an up-down counter, and are counted up.

The tape is then wound in the reverse direction by the reel motor. In this case, the tape cannot travel immediately at constant speed, due to the inertia of the reel, but its speed is gradually increased to reach a constant speed. At a predetermined period of time after the tape has reached the constant speed, a stop signal is supplied to the reel motor. The tape is gradually decelerated due to the inertia of the reel and is then stopped. During the reverse tape travel, the output pulses from the tachometer are counted down by the up-down counter. Therefore, the count value of the up-down counter exhibits a negative value corresponding to the absolute value of the difference between the initial up-count value and the down-count value.

The tape is then wound in the forward direction. The tape speed is gradually increased until it reaches the constant speed. In response to the tape travel, the output pulses from the tachometer are counted up. The point at which the tape has reached the constant speed and the negative count value of the up-down counter becomes zero is considered to coincide with an original point at which the tape travel stop instruction was initially generated. Therefore, the repositioning operation is completed at this point, and the tape forward travel is continued. Then, read/write operations for the next and thereafter data blocks are made.

However, in the repositioner of the conventional streaming magnetic tape drive apparatus which performs the above-mentioned operation, slippage between the tape and the rotating member of the tachometer and count errors of the output pulses of the tachometer are directly reflected as tape position detection errors of the tachometer. Therefore, the tape position at which the up-down counter starts counting does not always coincide with the tape position at which the negative count value of the counter is increased to zero since errors are accumulated over a long distance. Therefore, the tape position at which the negative count value of the counter is increased to zero cannot coincide with the tape position at which the counting operation starts, i.e., the Nth IBG, and often enters the Nth or (N+1)th data block. For this reason, adjacent correct data blocks are sometimes erroneously erased or a read operation is started midway along an adjacent data block.

SUMMARY OF THE INVENTION

The present invention has been made in consideration of the above situation, and has as its object to provide a repositioner for a streaming magnetic tape drive apparatus which indicates an alarm when slippage between a tape and a rotating member of a tachometer occurs or output pulses of the tachometer are erroneously counted, thereby inhibiting data read/write access.

According to the present invention, there is provided a repositioner for a streaming magnetic tape drive apparatus for performing data read/write access while winding a magnetic tape at constant speed by a reel motor, comprising travel distance measuring means for measuring a travel distance of said magnetic tape; tape stop detection means for detecting that said magnetic tape is stopped and generating a stop detection signal; data block edge detection means for detecting front and rear edges of a data block recorded on said magnetic tape and generating front and rear edge detection signals; and a control means, which is operated in response to a repositioning instruction from an external device, for, firstly, supplying a drive stop instruction to said reel motor and a measurement start instruction to said travel distance measuring means to start measurement of a first travel distance when a predetermined edge detection signal is supplied from said data block edge detection means within a predetermined time period around the reception of the repositioning instruction, secondly, supplying, when the stop detection signal is supplied from said tape stop detection means, a reverse drive instruction to said reel motor and a measurement start instruction for a reverse tape travel distance to said travel distance measuring means to start measurement of a second travel distance, and, thirdly, outputting to the external device, when a predetermined edge detection signal is supplied from said data block edge detection means within a predetermined time period after the first and second travel distances measured by said travel distance measuring means become equal to each other, a first normal operation signal for signaling that a repositioning operation is normally performed.

DETAILED DESCRIPTION OF THE PREFERRED EMBODIMENTS

Figure 1:
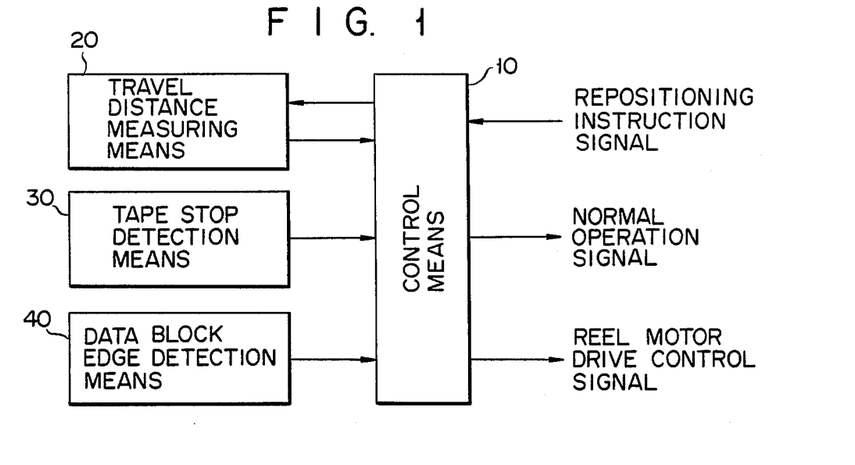
Fig. 1 is a schematic block diagram of a repositioner for a streaming magnetic tape drive apparatus according to an embodiment of the present invention.

An embodiment of the present invention will now be described with reference to the accompanying drawings. Referring to FIG. 1, control means 10 supplies a measurement start instruction to travel distance measuring means 20, and controls rotation of a reel motor (not shown) for winding a magnetic tape. Upon reception of the measurement start instruction, travel distance measuring means 20 starts measurement of the travel distance of a magnetic tape (not shown), and outputs the measurement result to control means 10. When tape stop detection means 30 detects that the reel motor for winding the magnetic tape is stopped, it supplies a stop detection signal to control means 10. When data block edge detection means 40 detects a front or rear edge of a data block recorded on the magnetic tape, it outputs a front or rear edge detection signal.

When control means 10 receives a repositioning instruction signal from a main control apparatus, e.g., a host computer (not shown), if it receives the front or rear edge detection signal from means 40 within a predetermined period of time therearound, it outputs a drive stop instruction for the reel motor, and supplies the measurement start instruction to means 20. Thereafter, when means 10 receives the stop detection signal from means 30, it outputs a reverse drive instruction to the reel motor, and supplies a measurement start instruction for measuring the reverse tape travel distance to means 20. When the forward tape travel distance is equal to the reverse tape travel distance measured by means 20, if means 10 receives the front or rear edge detection signal from means 40 within a predetermined period of time, it outputs a signal representing it to the main control apparatus.

The main control apparatus can be set so that it inhibits its data read/write access when this signal is not supplied from means 10. Therefore, correct adjacent data blocks can be protected from being erroneously erased and read access will not be started midway along an adjacent data block.

Figure 2:
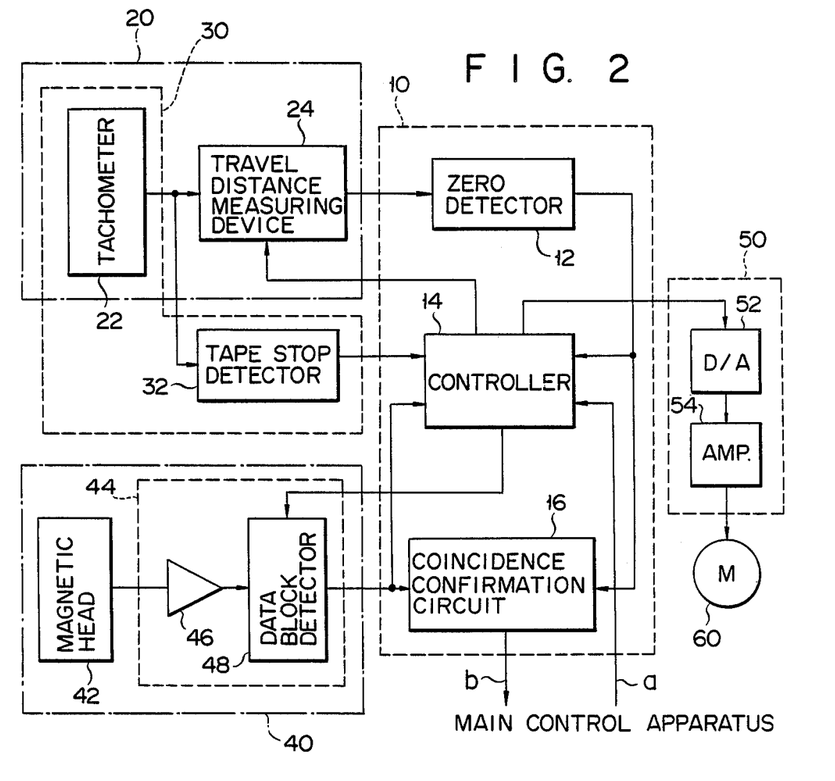
FIG. 2 is a detailed block diagram of the repositioner shown in FIG. 1.

FIG. 2 shows the arrangement of the repositioner shown in FIG. 1 in more detail. Control means 10 comprises zero detector 12, controller 14, and coincidence confirmation circuit 16. Travel distance measuring means 20 comprises tachometer 22 and travel distance measuring device 24. Tape stop detection means 30 comprises tachometer 22 and tape stop detector 32. Data block edge detection means 40 comprises magnetic head 42 and data block edge detector 44. Referring to FIG. 2, reference numeral 50 denotes a motor drive controller consisting of digital/analog converter 52 and servo amplifier 54; and 60, a reel motor for winding a tape.

More specifically, the travel distance of the magnetic tape is measured using tachometer 22 provided to a tape drive system. Tachometer 22 consists of, e.g., a light-emitting element, a light-receiving element, and a rotating member which is arranged between these elements, has a slit, and is in frictional contact with the tape. Tachometer 22 generates a pulse each time light from the light-emitting element is received by the light-receiving element through the slit upon rotation of the rotating member. The output pulses from tachometer 22 are measured by travel distance measuring device 24. Device 24 is, e.g., an up-down counter, which counts up the output pulse of tachometer 22 when the tape travels in the forward direction and counts down when it travels in the reverse direction. The output pulses are also supplied to tape stop detector 32. Detector 32 generates a stop detection signal when no output pulse is generated from tachometer 22.

Data blocks recorded on the magnetic tape are read or written by magnetic head 42. Data block edge detector 44 comprises read signal amplifier 46 for amplifying an output signal from magnetic head 42, and data block detector 48 which detects front and rear edges of a data block in accordance with the output signal from head 42 and outputs the front and rear edge detection signals. Detector 48 receives a signal representing a tape travel direction from controller 14, and can detect whether the detected data block edge is a front or rear edge.

Zero detector 12 detects that the count output of measuring device (up-down counter) 24 has reached zero, and thereupon outputs a zero detection signal to controller 14 and coincidence confirmation circuit 16. Controller 14 controls the repositioner, and starts its control operation (to be described later) in response to repositioning instruction a from the external main control apparatus during tape travel. When coincidence confirmation circuit 16 receives the zero detection signal from detector 12 and also receives the front or rear edge detection signal from detector 44 within a predetermined period of time therearound, it outputs coincidence signal b to the main control apparatus. Therefore, the main control apparatus can detect a repositioning error when coincidence signal b is not supplied thereto. If the main control apparatus is preset such that it inhibits data read/write access in this case, correct adjacent data blocks will not be erased, and a read operation will not start midway along an adjacent data block.

Figure 3:
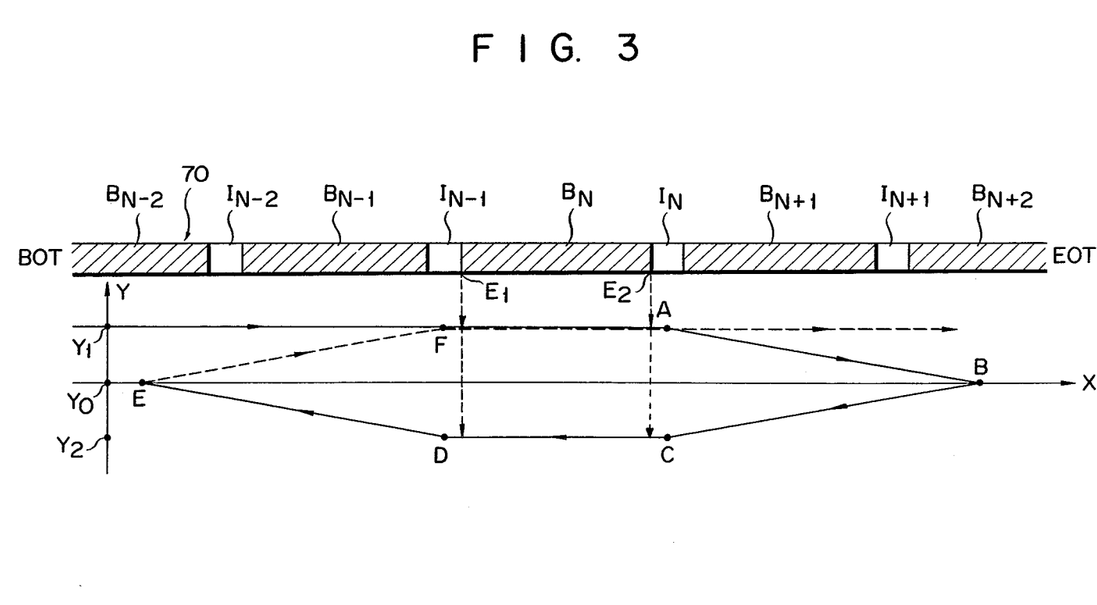
FIG. 3 is a diagram for explaining a repositioning operation.
Figure 4A:
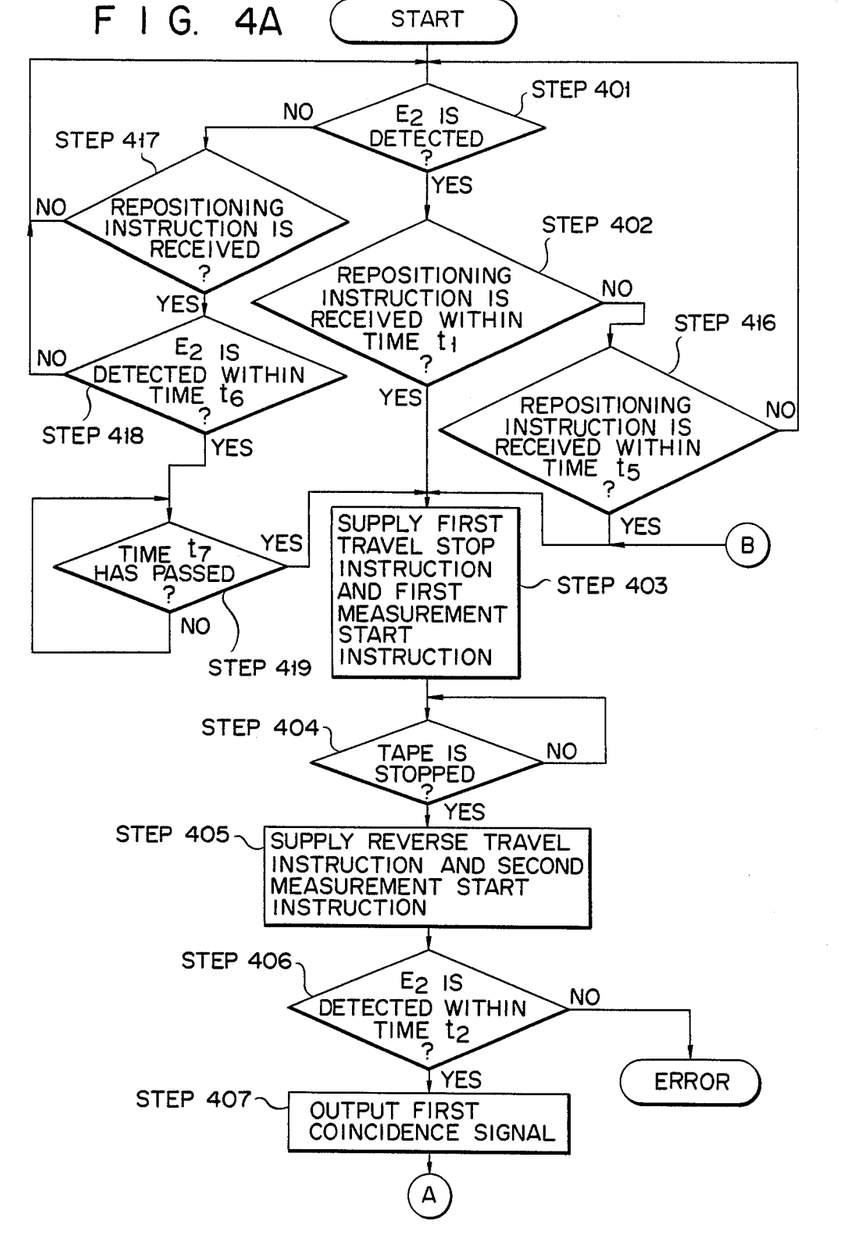
FIGS. 4A and 4B are flow charts for explaining the operation of a repositioning controller shown in FIG. 2.

The operation will be explained in more detail with reference to FIGS. 3, 4A, and 4B. Referring to FIG. 3, reference numeral 70 denotes a magnetic tape; BOT, a beginning of tape 70; and EOT, an end of tape 70. Reference symbol $B_N$ denotes an Nth data block from the BOT of tape 70; $B_{N+1}$, an (N+1)th data block; $I_N$, an Nth IBG from the BOT; $E_1$, a front edge of a data block; and $E_2$, a rear edge. Horizontal axis X represents a tape position at which tape 70 is located at magnetic head 42, and vertical axis Y above axis X represents a tape travel speed in the forward direction (a direction for winding tape 70 toward the BOT) and that below axis X represents a tape travel speed in the reverse direction. Point $Y_0$ represents that the tape travel speed is zero (i.e., the tape is stopped), position $Y_1$ represents a constant forward tape travel speed, and point $Y_2$ represents a constant reverse tape travel speed (e.g., $Y_1 = Y_2$).

Normally, tape 70 continuously travels in the forward direction under the control of motor drive controller 50, controlled by the main control apparatus (not shown), and data block read/write access is performed by head 42.

Assume that repositioning instruction a is generated from the main control apparatus at point A passing, e.g., Nth data block $B_N$ of tape 70, as shown in FIG. 3. Since point A falls within an IBG ($I_N$), in the flow chart of FIG. 4A, rear edge $E_2$ is detected by detector 44 and a rear edge detection signal is generated (step 401), and instruction a is detected within first predetermined time period $t_1$ (corresponding to the distance of the IBG) (step 402). If repositioning instruction a is supplied at point A (step 402), controller 14 supplies a first travel stop instruction signal to motor drive controller 50, and outputs a first measurement start instruction signal to up-down counter 24 to start up counting (step 403). The travel speed of tape 70 is gradually reduced due to the inertia of the reel, as shown in FIG. 3, and tape 70 is stopped at point B passing the IBG ($I_N$). The travel distance of tape 70 between points A and B is measured by counting the output pulses of tachometer 22 by up-down counter 24.

When tape 70 is stopped, since no output pulse is generated from tachometer 22, detector 32 detects it and outputs a first tape stop detection signal to controller 14.

Upon reception of the first tape stop detection signal (step 404), controller 14 sends a reverse direction instruction signal to reel motor 60 through motor drive controller 50, and sends a second measurement start instruction signal to counter 24 to start down counting (step 405). The speed of tape 70 is gradually increased and becomes constant at point C, as shown in FIG. 3. During this interval, the output pulses from tachometer 22 are counted down by up-down counter 24. Therefore, the count value counted during an interval from point A to B is subtracted from the newest count value, and becomes zero at point C (the distance between points B and C is substantially equal to the distance between points A and B).

Even if slippage between tape 70 and the rotating member of tachometer 22 occurs, or the output pulses are erroneously counted by counter 24, since the distances between points A and B and between B and C are very short, point C at which the count value of counter 24 becomes zero is sufficiently close to point A, and is located within the IBG ($I_N$).

When the count value of counter 24 becomes zero, a first zero detection signal is supplied from zero detector 12 to controller 14 and coincidence confirmation circuit 16. Reverse travel of tape 70 is continued at constant speed $Y_2$.

When tape 70 passes point C and further travels in the reverse direction, coincidence confirmation circuit 16 receives a rear edge ($E_2$) detection signal from data block edge detector 44 based on the output of head 42. Upon reception of this signal within second predetermined time period $t_2$ (e.g., corresponding to the distance of the IBG) (step 406), circuit 16 detects a first coincidence, and outputs first coincidence signal b to the main control apparatus (step 407). If signal b is not supplied, the main control apparatus detects an error, i.e., that point C is located in a data block, and inhibits the repositioning operation, thus signaling the error to the user (e.g., by generating an alarm sound).

When first coincidence signal b is generated, the main control apparatus continues the repositioning operation. More specifically, controller 14 causes tape 70 to travel in the reverse direction at constant speed. At front edge $E_1$ of data block $B_N$, when detector 44 detects front edge $E_1$ and outputs the front edge detection signal to controller 14 (step 408), controller 14 outputs a second travel stop instruction signal to controller 50 after third predetermined time period $t_3$ (e.g., corresponding to a distance $\frac{1}{2}$ that of the IBG) has passed, i.e., at point D, and also outputs a third measurement start instruction signal to counter 24 to start down counting (step 409). The travel speed of tape 70 is gradually reduced from point D and tape 70 is stopped at point E. The output pulses of tachometer 22 during an interval from point D to E are counted down from zero by counter 24. When tape 70 is stopped at point E, a second tape stop detection signal is supplied from detector 32 to controller 14.

Upon reception of this signal (step 410), controller 14 outputs a forward drive instruction for reel motor 60 to controller 50, and sends a fourth measurement start instruction signal to counter 24 to start up counting (step 411). The travel speed of tape 70 is gradually increased due to the inertia of the reel, as shown in FIG. 3, and reaches constant speed at point F. During this interval, the output pulses from tachometer 22 are counted up by counter 24. Therefore, the count value of counter 24 becomes substantially zero at point F at which the distance between points D and E is substantially equal to the distance between points E and F.

When the count value of counter 24 becomes zero, a second zero detection signal is supplied from zero detector 12 to controller 14 and coincidence confirmation circuit 16. Tape 70 keeps traveling in the forward direction at constant speed $Y_1$.

In the same manner as described above, even if slippage between tape 70 and tachometer 22 occurs or the output pulse is erroneously counted by counter 24, the distances between points D and E and between E and F are very short. Therefore, point F which makes the count value of counter 24 zero is located adjacent to point D, and within the IBG ($I_{N-1}$).

When tape 70 passes point F and further travels in the forward direction, Nth data block $B_N$ passes head 42, and detector 44 outputs a front edge ($E_1$) detection signal of data block $B_N$ to coincidence confirmation circuit 16. If circuit 16 receives the zero detection signal within fourth predetermined time period $t_4$ (e.g., corresponding to the distance of IBG) from the reception of the front edge detection signal (step 412), it confirms a second coincidence, and outputs second coincidence signal b to the main control apparatus (step 413). If signal b is not supplied, the main control apparatus detects an error, i.e., that point F is located in a data block, and inhibits the repositioning operation, thus signaling the error to the user (e.g., by generating an alarm sound).

Thereafter, when tape 70 further travels and the rear edge ($E_2$) detection signal is supplied to circuit 16 (step 414), circuit 16 outputs third coincidence signal b to the main control apparatus in order to signal that the repositioning operation is completed (step 415). Thus, the repositioning operation is completed, and controller 50 is controlled by the main control apparatus, thus performing read/write access of next data block $B_{N+1}$ and thereafter.

In this manner, since the count values for very short distances are compared to perform error detection twice, an accurate repositioning operation can be performed In addition, in the repositioning operation, tape 70 temporarily passes the IBG ($I_N$) in the reverse direction while confirming data block $B_N$ before the IBG ($I_N$) by head 42, and then travels in the forward direction to again confirm block $B_N$ by head 42. Therefore, head 42 can be accurately positioned at the IBG ($I_N$) between Nth data block $B_N$ and next data block $B_{N+1}$.

A case will be described wherein repositioning instruction a is supplied when tape 70 has passed the Nth IBG ($I_N$) and has just entered next data block $B_{N+1}$. More specifically, if repositioning instruction a is supplied within fifth predetermined time period $t_5$ (corresponding to the distance of the IBG+$\alpha$) from the reception of the rear edge detection signal (step 416), a position at which tape 70 is driven as indicated by steps 403 to 405 and travels again at constant speed is adjacent to a position (the distance of the IBG+$\alpha$) at which repositioning instruction a is received. As indicated by steps 406 and 407, first coincidence signal b is supplied to the main control apparatus. In this case, however, second predetermined time period $t_2$ is long enough to compensate for +$\alpha$ in time period $t_5$. Thereafter, the same operation after step 408 is performed.

When repositioning instruction a is supplied immediately before the end of Nth data block $B_N$, tape 70 continues constant-speed travel until the rear edge $E_2$ of data block $B_N$ is detected within sixth predetermined time period $t_6$ (step 418) from when repositioning instruction a is received (step 417). After a seventh predetermined time period $t_7$ (e.g., corresponding to ½ the distance of the IBG) after the rear edge detection signal is supplied from detector 44 (step 419), the flow can then advance to step 403.

Figure 5:
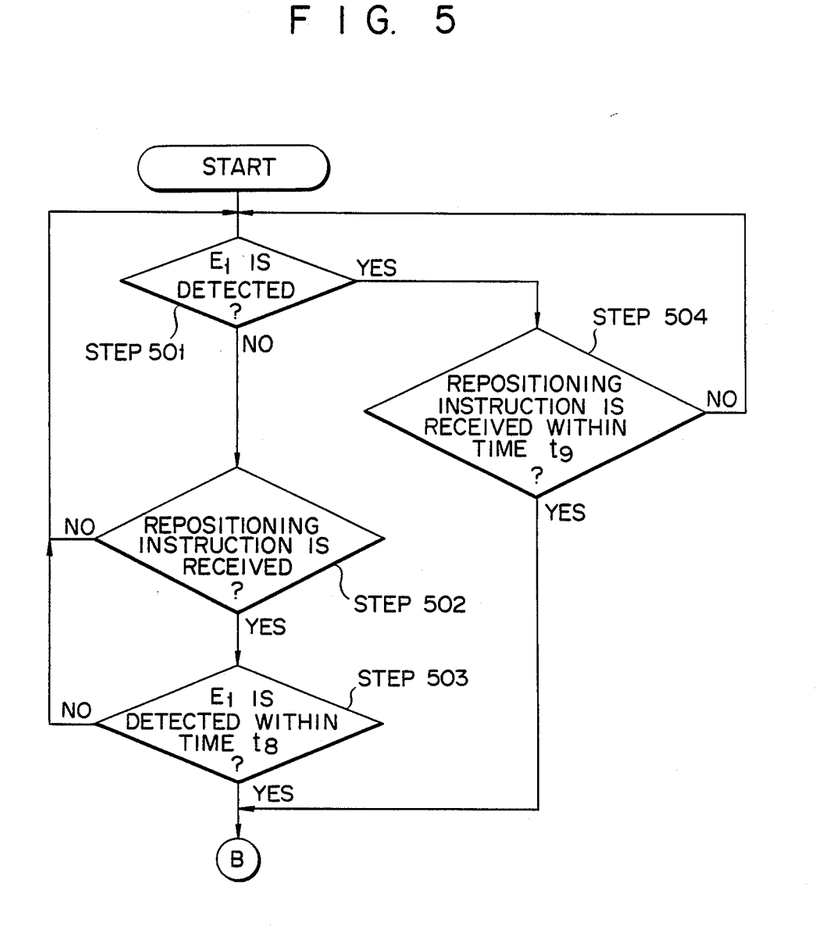
FIG. 5 is a flow chart for explaining another operation of the repositioning controller shown in FIG. 2.

FIG. 5 is a flow chart of the operation when front edge $E_1$ is used as the repositioning start position instead of rear edge $E_2$. More specifically, when repositioning instruction a is supplied at a point within the $I_N$, front edge $E_1$ has not yet been detected (step 501). Therefore, if repositioning instruction a is supplied at this point (step 502), forward tape travel is continued until front edge $E_1$ is detected. If front edge $E_1$ is detected within eighth predetermined time period $t_8$ (e.g., corresponding to the distance of the IBG) (step 503), the flow can advance to step 403 shown in FIG. 4A, so that the repositioning operation as in the above embodiment can be performed.

This applies to a case wherein repositioning instruction a is supplied immediately before the $I_N$. In this case, eighth predetermined time period $t_8$ is set to be long enough to correspond to the distance of the IBG +$\alpha$.

When repositioning instruction a is supplied immediately after the $I_N$, the flow advances from step 501 in FIG. 5 to step 504. More specifically, only when repositioning instruction a is supplied within ninth predetermined time period $t_9$ (step 502) after front edge $E_1$ is detected (step 501), the repositioning operation is performed.

Figures 4B, 4C:
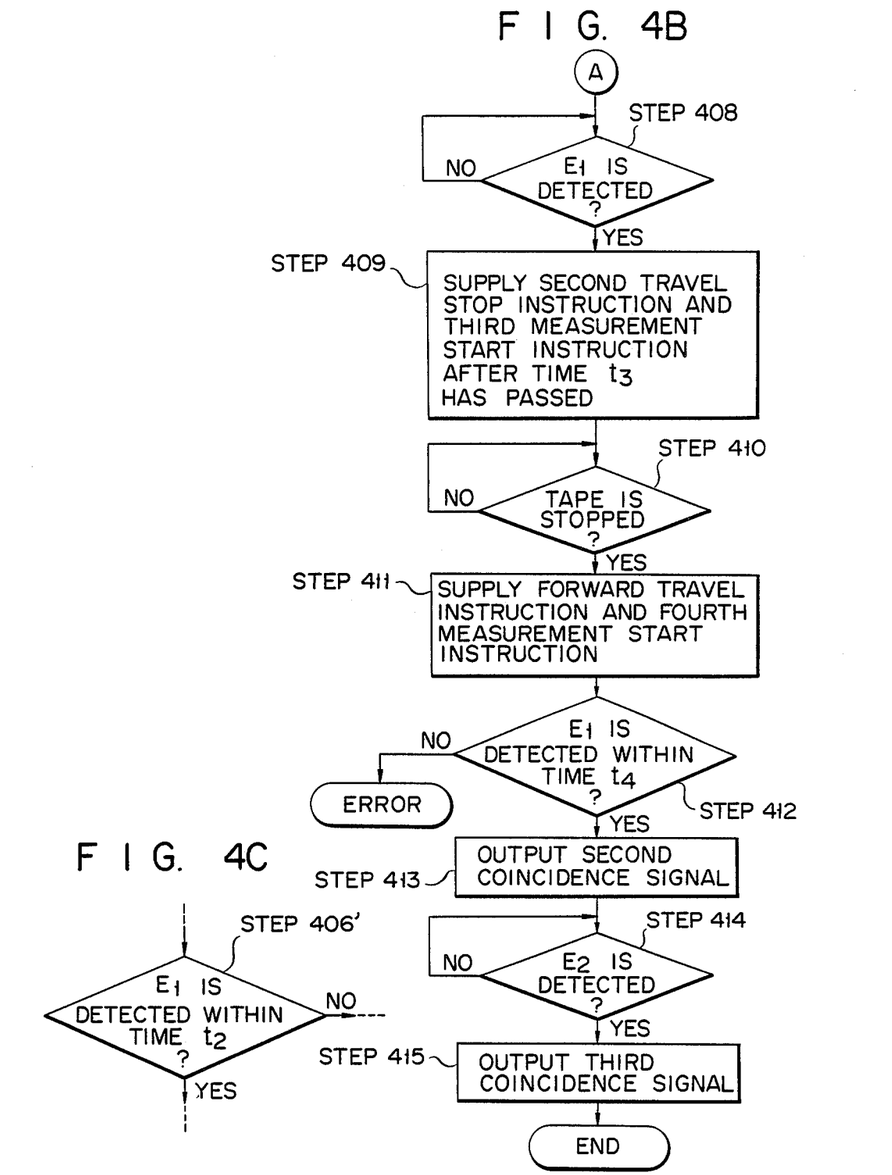
FIG. 4C is a flow chart showing a modification of step 406 in FIG. 4A.

Note that in place of detecting rear edge $E_2$ in step 406, if the operation is made in response to detection of front edge $E_1$ as indicated by step 406' in FIG. 4C, the same effect as described above can be obtained.

According to the present invention as described above, a device for measuring a tape travel distance is simply used as a rough criterion for tape positioning, and an actual data block edge is detected based on a magnetic head signal to perform the repositioning operation. Even if slippage between the tape and the rotating member of the tachometer occurs or the output pulses of the tachometer are erroneously detected, the tape can be accurately repositioned to a designated IBG. Therefore, unlike a conventional apparatus, data will not be erroneously erased or data read access will not be started midway along a data block.

What is claimed is:

1. A repositioner for a streaming magnetic tape drive apparatus for performing data read/write access while magnetic tape is wound at constant speed by a reel motor, comprising:
   travel distance measuring means for measuring a travel distance of said magnetic tape;
   tape stop detection means for detecting that said magnetic tape is stopped and generating a stop detection signal;
   data block edge detection means for detecting front and rear edges of a data block recorded on said magnetic tape and generating front and rear edge detection signals;
   receiving means for receiving a repositioning instruction from an external device;
   outputting means for outputting first and second normal operation signals, which indicate that a repositioning operation is normally performed, to the external device; and
   control means, which is operated when said repositioning instruction is received by said receiving means, for, firstly, supplying a drive stop instruction to said reel motor and a measurement start instruction to said travel distance measuring means to start measurement of a first travel distance when a first predetermined edge detection signal is supplied from said data block edge detection means within a predetermined time period around the reception of the repositioning instruction, secondly, supplying a reverse drive instruction to said reel motor and a measurement start instruction for a reverse tape travel distance to said travel distance measuring means to start measurement of a second travel distance when the stop detection signal is supplied from said tape stop detection means, thirdly, causing said outputting means to output said first normal operation signal to the external device when a second predetermined edge detection signal is supplied from said data block edge detection means within a predetermined time period after the first and second travel distances meaursed by said travel distance measuring means become equal to each other, fourthly, supplying a drive stop instruction to said reel motor and a measurement start instruction to said travel distance measuring means to start measurement of a third travel distance in response to the front edge detection signal from said data block edge detection means after outputting the first normal operation signal by means of said outputting means, fifthly, supplying a forward drive instruction to said reel motor and a measurement start instruction for a forward tape travel distance to said travel distance measurment means to start measurement of a fourth travel distance in response to the stop detection signal from said tape stop detection means, and sixthly, causing said outputting means to output said second normal operation signal to the external device in response to the front edge detection signal from said data block edge detection means within a predetermined period after the third and fourth travel distances measured by said travel distance measuring means become equal to each other.

2. A repositioner according to claim 1, wherein said control means is operated when it receives the repositioning instruction within a predetermined time period after the rear edge detection signal as said first predetermined edge detection signal has been supplied from said data block edge detection means.

3. A repositioner according to claim 2, wherein said control means outputs the first normal operation signal when it receives rear edge detection signal as said second predetermined edge detection signal within a predetermined time period after the first and second travel distances become equal to each other.

4. A repositioner according to claim 2, wherein said control means outputs the first normal operation signal when it receives the front edge detection signal as said second predetermined edge detection signal within a predetermined time period afterthe first and second travel distances become equal to each other.

5. A repositioner according to claim 1, wherein said control means is operated when it receives the rear edge detection signal of a data block as said first predetermined edge detection signal from said data block edge detection means within a predetermined time period after it has received the respositioning instruction.

6. A repositioner according to claim 5, wherein said control means output the first normal operation signal when it receives the rear edge detection signal as said second predetermined edge detection signal within a predetermined time period after the first and second travel distances become equal to each other.

7. A repositioner according to claim 5, wherein said control means outputs the first normal operation signal when it receives the front edge detection signal as said second predetermined edge detection signal within a predetermined time period after the first and second travel distances become equal to each other.

8. A repositioner according to claim 1, wherein said control means is operated when it receives the repositioning instruction within a predetermined time period after reception of the front edge detection signal of a data block as said first predetermined edge detection signal from said data block edge detection means.

9. A repositioner according to claim 8, wherein said control means outputs the first normal operation signal when it receives the rear edge detection signal as said second predetermined edge detection signal within a predetermined time period after the first and second travel distances become equal to each other.

10. A repositioner according to claim 8, wherein said control means outputs the first normal operation signal when it receives the front edge detection signal as said second predetermined edge detection signal within a predetermined time period after reception of the repositioning instruction.

11. A repositioner according to claim 1, wherein said control means is operated when it receives the front edge detection signal as said first predetermined edge detection signal within a predetermined time period after reception of the repositioning instruction.

12. A repositioner according to claim 11, wherein said control means outputs the first normal operation signal when it receives the rear edge detection signal as said second predetermined edge detection signal within a predetermined time period after the first and second travel distances become equal to each other.

13. A repositioner according to claim 11, wherein said control means outputs the first normal operation signal when it receives the front edge detection signal as said second predetermined edge detection signal within a predetermined time period after the first and second travel distances become equal to each other.

14. A repositioner according to claim 1, wherein said control means includes means for outputting, to the external device, a siganl indicative of the detetion of the rear edge when the rear edge is detected by said data block edge detection means after said second normal operation signal is output from said outputting means.

15. A repositioner according to claim 1, wherein
said travel distance measuring means comprises a tachometer for outputting pulses upon travel of said magnetic tape, and an up-down counter for counting the output pulse from said tachometer;
said tape stop detection means outputs the stop detection signal when said tachometer generates no output pulse;
said data block edge detection means includes a magnetic head, and detects front and rear edges of a data block in accordance with an output signal from said magnetic head;
said control means supplies up- and down-count start instructions to said up-down counter to start measurement of the first and second travel distances, and when a count value of said up-down counter becomes zero, determines that the first and second travel distances are equal to each other; and
said control means supplies up- and down-count start instructions to said up-down counter to start measurement of the third and fourth travel distances, and when a count value of said up-down counter becomes zero, determines that the third and fourth travel distances are equal to each other.

16. A repositioning method for a streaming magnetic tape drive apparatus for performing data read/write access while winding a magnetic tape at constant speed by a reel motor, comprising the steps of:
supplying a drive stop instruction to said reel motor and starting measurement of a first travel distance of said magnetic tape in response to a detection of a first predetermined edge of a data block recorded on said magnetic tape within a predetermined time period around reception of a repositioning instruction from an external device;
supplying a reverse drive instruction to said reel motor and starting measurement of a second travel distance of said magnetic tape in a reverse direction when it is detected that said magnetic tape is stopped;
outputting, to the external device, a first normal operation signal for signaling that a repositioning operation is normally performed, upon detection of a second predetermined edge within a predetermined time period after the first and second travel distance become equal to each other;

supplying a drive stop instruction to said reel motor and starting measurement of a third travel distance upon detection of the front edge after outputting the first normal operation signal;

supplying a forward drive instruction to said reel motor and starting measurement of a fourth travel distance of said magnetic tape in a forward direction when it is detected that said magnetic tape is stopped; and outputting, to the external device, a second normal operation signal for signaling that the repositioning operation is normally performed upon detection of the front edge within a predetermined time period after the third and fourth travel distances become equal to each other.

17. A method according to claim 16, wherein measurement of the first travel distance is started when the repositioning instruction is received within a predetermined time period after detection of the rear edge as said first predetermined edge of the data block.

18. A method according to claim 17, wherein the first normal operation signal is generated when the rear edge as said second predetermined edge is detected within a predetermined time period after the first and second travel distances become equal to each other.

19. A method according to claim 17, wherein the first normal operation signal is generated when the front edge as said second predetermined edge is detected within a predetermined time period after the first and second travel distances become equal to each other.

20. A method according to claim 16, wherein measurement of the first travel distance is started when the rear edge as said first predetermined edge of a data block is detected within a predetermined time period after reception of the repositioning instruction.

21. A method according to claim 20, wherein the first normal operation signal is generated when the rear edge as said second predetermined edge is detected within a predetermined time period after the first and second travel distances become equal to each other.

22. A method according to claim 20, wherein the first normal operation signal is generated when the front edge as said second predetermined edge is detected within a predetermined time period after the first and second travel distances become equal to each other.

23. A method according to claim 16, wherein measurement of the first travel distance is started when the repositioning instruction is received within a predetermined period of time after detection of the front edge as said first predetermined edge of the data block.

24. A method according to claim 23, wherein the first normal operation signal is generated when the rear edge as said second predetermined edge is detected within a predetermined time period after the first and second travel distances become equal to each other.

25. A method according to claim 23, wherein the first normal operation signal is generated when the front edge as said second predetermined edge is detected within a predetermined time period after the first and second travel distances become equal to each other.

26. A method according to claim 16, wherein measurement of the first travel distance is started when the front edge as said second predetermined edge of a data block is detected within a predetermined time period after reception of the repositioning instruction.

27. A method according to claim 26, wherein the first normal operation signal is generated when the rear edge as said second predetermined edge is detected within a predetermined time period after the first and second travel distances become equal to each other.

28. A method according to claim 26, wherein the first normal operation signal is generated when the front edge as said second predetermined edge is detected within a predetermined time period after the first and second travel distances become equal to each other.

29. A method according to claim 16, further comprising the step of outputting, to the external device, a signal indicating that the rear edge is detected after outputting said second normal operation signal.

30. A method according to claim 16, wherein the travel distance is measured by a tachometer for outputting pulses upon travel of said magnetic tape and an up-down counter for counting the output pulses from said tachometer; stop of said magnetic tape is detected when no output pulse is generated from said tachometer; front and rear edges of the data block are detected in accordance with an output signal from a magnetic head; measurement of the first and second travel distances is started when up-and down-count start instructions are supplied to said up-down counter, and when a count value of asid up-down counter becomes zero, it is determined th at t he first and second travel distances are equal to each other; and measurement of the third and fourth travel distances is started when up- and down-count start instructions are supplied to said up-down counter, and when a count value of said up-down counter becomes zero, it is determined that the third and fourth travel distances are equal to each other.

* * * * *